(12) United States Patent  
Seitel et al.

(10) Patent No.: US 9,533,833 B2
(45) Date of Patent: Jan. 3, 2017

(54) UNJAMMING SYSTEM FOR PRODUCT FEEDERS

(71) Applicants: Norbert Seitel, Gillette, NJ (US); Michael Seitel, Randolph, NJ (US)

(72) Inventors: Norbert Seitel, Gillette, NJ (US); Michael Seitel, Randolph, NJ (US)

(73) Assignee: Norwalt Design, Inc., Randolph, NJ (US)

( * ) Notice: Subject to any disclaimer, the term of this patent is extended or adjusted under 35 U.S.C. 154(b) by 43 days.

(21) Appl. No.: 14/455,049

(22) Filed: Aug. 8, 2014

(65) Prior Publication Data

US 2015/0041282 A1 Feb. 12, 2015

Related U.S. Application Data

(60) Provisional application No. 61/863,505, filed on Aug. 8, 2013.

(51) Int. Cl.
*B65G 43/08* (2006.01)
*B65G 47/52* (2006.01)
*B65G 47/14* (2006.01)

(52) U.S. Cl.
CPC ........... *B65G 43/08* (2013.01); *B65G 47/1435* (2013.01); *B65G 47/525* (2013.01)

(58) Field of Classification Search
None
See application file for complete search history.

(56) References Cited

U.S. PATENT DOCUMENTS

| 2,853,176 | A | | 9/1958 | Kay |
| 3,101,832 | A | | 8/1963 | Wyle |
| 3,224,554 | A | | 12/1965 | Moulder |
| 3,735,859 | A | | 5/1973 | Miller |
| 4,093,062 | A | | 6/1978 | Sjogren |
| 4,401,203 | A | | 8/1983 | McDonald |
| 4,576,286 | A | * | 3/1986 | Buckley .................... B07C 5/02 209/558 |
| 4,938,082 | A | | 7/1990 | Buckley |
| 7,007,443 | B2 | | 3/2006 | Liedtke |
| 8,048,318 | B1 | | 11/2011 | Mogan |

* cited by examiner

*Primary Examiner* — Kavel Singh
(74) *Attorney, Agent, or Firm* — Hoffmann & Baron, LLP

(57) ABSTRACT

An unjamming system is used in connection with mass-produced parts fed through a process by a rotating bowl feeder. The bowl feeder has a bowl with an axis of rotation and an outer wall. The parts are disposed against the outer wall by centrifugal force. The unjamming system includes a jamming region adjacent the bowl, wherein unjamming is carried out. A sensor adjacent the jamming region detects a jam. A pneumatic cylinder actuator and an air blow jet adjacent the jamming region removes the parts from the jam. The parts are returned to the bowl by the air blow jet.

4 Claims, 17 Drawing Sheets

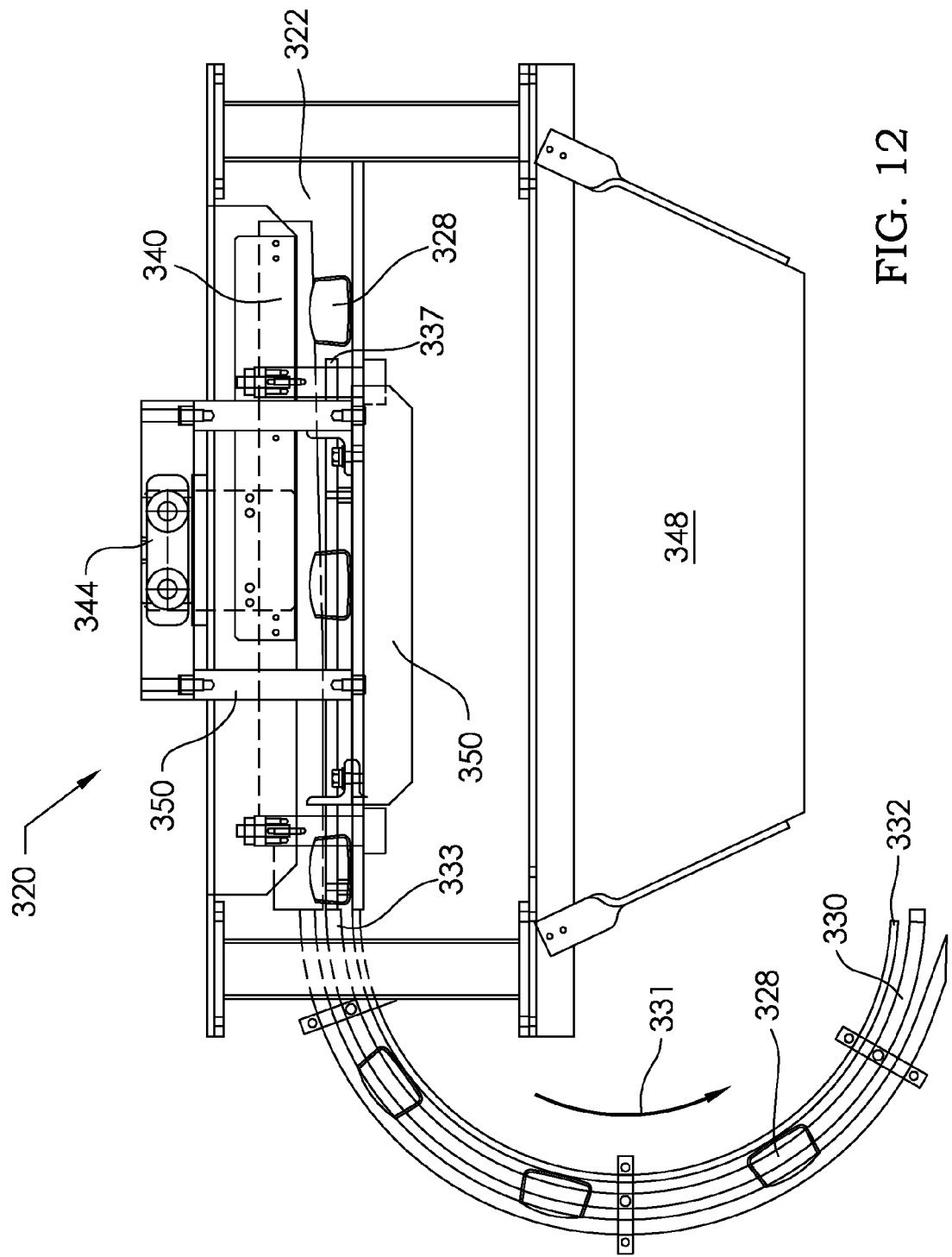

UNJAMMING SYSTEM FOR PRODUCT FEEDERS

INCORPORATION BY REFERENCE

Provisional patent application No. 61/863,505, filed on Aug. 8, 2013, is herein incorporated by reference in its entirety for the technology disclosed therein, and the benefit of the filing date Aug. 8, 2013 is hereby claimed.

TECHNICAL FIELD

The presently disclosed technologies are directed generally to a centrifugal bowl which feeds mass-produced parts into an automated assembly line, and more specifically, to an apparatus and method that removes a parts jam and restores the feeder to a functional state.

BACKGROUND

In the manufacture and assembly of mass-produced products, for example deodorant canisters made up of several different type parts, each part type is fed in quantity from a part source into a parts feeder. Examples of part sources include injection molding, stamping, forging, casting, or any mass-production process. The parts are conveyed to a collection area and fed onto a track in a spaced apart sequence, and in a predetermined position, i.e., all parts upright and facing the same direction in preparation for automated assembly. Any means of parts feeding can be employed, for example, a rotating bowl feeder; a rotary vibrating feeder; a linear vibrating feeder; a belt feeder; or the like.

The parts sometimes enter the track inverted or sideways, causing a jam-up of multiple parts. In this event, the process must be temporarily halted, the jammed parts removed and re-introduced to the bowl feeder, and the process resumed. Heretofore, these steps were carried out manually, requiring an operator keeping constant vigil.

Accordingly, it would be desirable to provide an apparatus capable of sensing a jam, stopping the process, removing the jam, and restarting the process, all carried out automatically, thereby avoiding the problems associated with the prior art.

SUMMARY

In one aspect, an unjamming system is used in connection with mass-produced parts fed through a process path in a process direction. The parts are fed by a parts feeder. The unjamming system comprises a jamming region wherein unjamming is carried out. A sensor is provided adjacent the process path for detecting a part error. The sensor is adapted for generating a sensor signal. Removing means, adjacent the jamming region, is responsive to the sensor signal. The removing means is for removing the parts from the jamming region. Returning means returns the parts to the parts feeder. The returning means moves the parts in a direction opposite to the process direction.

In a second aspect, an unjamming system is for use in connection with mass-produced parts fed through a process path in a process direction. The parts are fed by a parts feeder. The unjamming system comprises a jamming region wherein unjamming is carried out. A sensor is provided adjacent the process path for detecting a part error. The sensor is adapted for generating a sensor signal. First and second opposed elongated guide bars are spaced apart a predetermined distance. The guide bars are adapted for receiving and conveying the parts between the guide bars. The process path extends between the guide bars.

The first guide bar has an opening therethrough adjacent the jamming region. A guide bar segment is disposed in the first guide bar opening. The guide bar segment is adapted for conveying the parts in concert with the first guide bar. The guide bar segment is adapted for movement transversely away from the process path in response to the sensor signal. This increases the distance between the guide bar segment and the second guide bar. Thus, clearance is provided for eliminating the part error.

In a third aspect, a method is disclosed for unjamming a part error. The method is used in connection with mass-produced parts fed through a process path in a process direction. The parts are fed by a parts feeder. The method comprises providing a jamming region wherein unjamming is carried out. A part error is detected with a sensor adjacent the process path. A sensor signal is generated with the sensor. The parts are removed from the part error in response to the sensor signal. The parts are moved in a direction opposite to the process direction. The parts are then returned to the parts feeder.

In a fourth aspect, a method is disclosed for unjamming a part error. The method is used in connection with mass-produced parts fed through a process path in a process direction. The parts are fed by a parts feeder. The method comprises providing a jamming region wherein unjamming is carried out. A part error is detected with a sensor adjacent the process path. A sensor signal is generated with the sensor. First and second opposed elongated guide bars are spaced apart a predetermined distance. The parts are received and conveyed between the first and second guide bars. The process path extends between the guide bars.

An opening is provided through the first guide bar adjacent the jamming region. A guide bar segment is disposed in the first guide bar opening. The parts are conveyed along the guide bar segment in concert with the first guide bar. The guide bar segment moves transversely away from the process path in response to the sensor signal. This increases the distance between the guide bar segment and the second guide bar, thereby providing clearance for eliminating the part error.

These and other aspects, objectives, features, and advantages of the disclosed technologies will become apparent from the following detailed description of illustrative embodiments thereof, which is to be read in connection with the accompanying drawings.

BRIEF DESCRIPTION OF THE DRAWINGS

FIG. 12 is a side elevational view of still another rotating bowl feeder utilizing still another unjamming system constructed in accordance with the invention.

DETAILED DESCRIPTION

Figure 1:
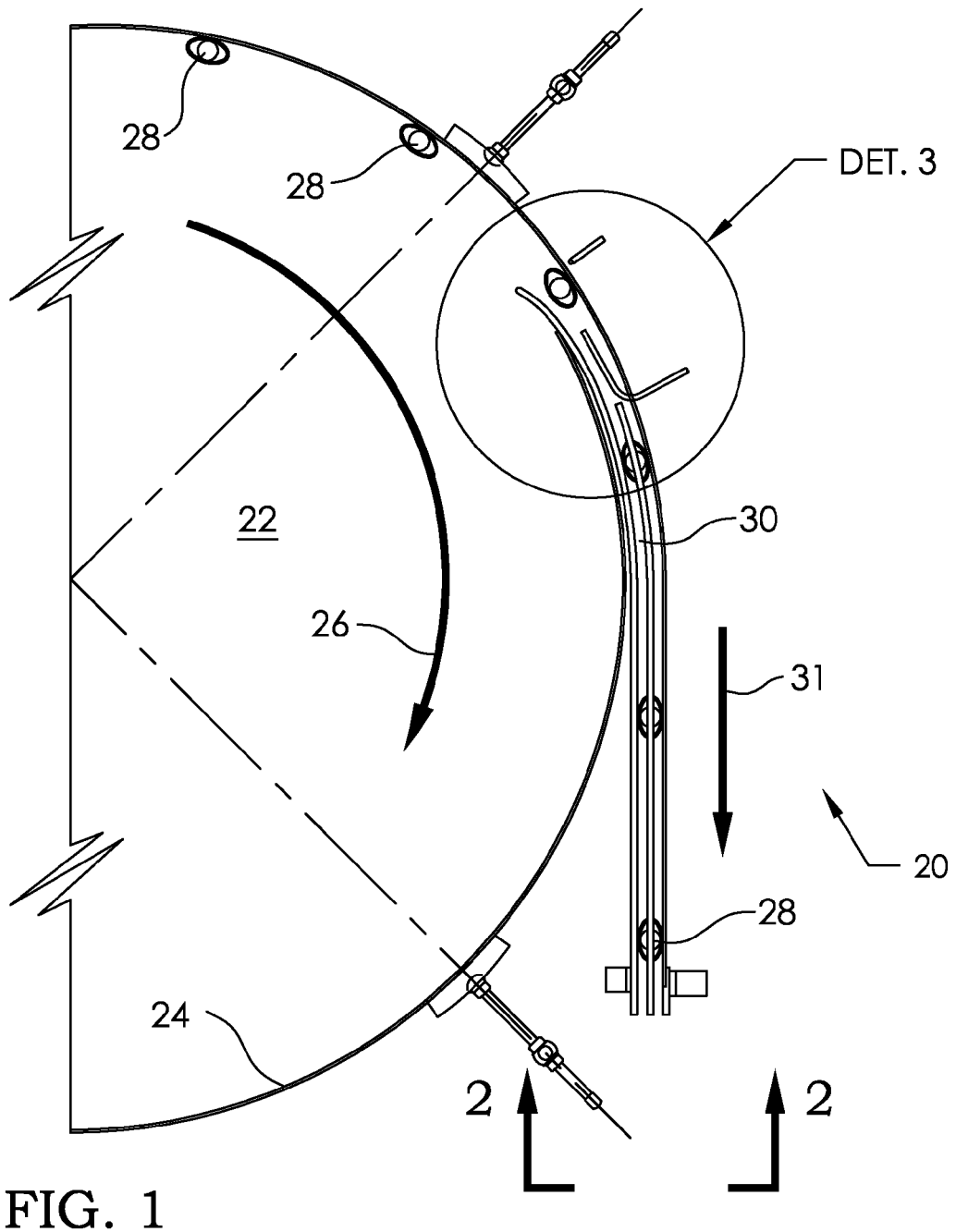
FIG. 1 is a partial, top plan view of a rotating bowl feeder utilizing an unjamming system constructed in accordance with the invention.
Figure 2:
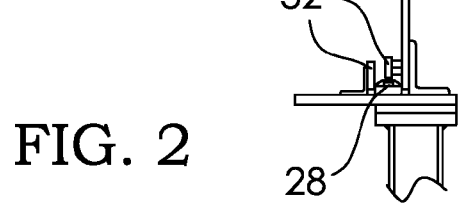
FIG. 2 is a partial, side elevational view of the rotating bowl feeder of FIG. 1, taken along lines 2-2 of FIG. 1.

Describing now in further detail these exemplary embodiments with reference to the Figures as described above, the unjamming system is typically used in a select location or locations of the process path or paths of various mass-produced product feeders. Although four exemplary rotating bowl feeder embodiments are illustrated herein, it is to be understood that the unjamming system disclosed is applicable with any process feeder within the spirit and scope of the claims. The product feeder can be rotary or linear; centrifugal or vibrating; track-fed; roller-fed; or belt-fed.

The product parts can be any mass-produced parts from any manufacturing process well known to those with ordinary skill in the art. Such processes comprise a "part source" and include, but are not limited to: injection molding; blow molding; die casting; sand casting; stamping; extruding; machining; or 3D printing. It should be noted that the drawings herein are not to scale.

As used herein, the term "process" refers to a procedure of moving, transporting and/or handling a product part. The part moves along a "process path" between assembly machines. The "process direction" is a directed flow path the product part moves in during the process. The process direction can be straight or arcuate. The direction "opposite to the process direction" means approximately 180° in reverse. It does not mean transverse at any angle. The "process rotary direction" is the direction in which a rotary feeder turns, either clockwise or counterclockwise, viewed from above, during normal operation.

As used herein, the term "process position" means the part is upright and facing in the correct position for further processing and assembly downstream. The term "skewed position" means the part is upside-down, or sideways, or angled, or jammed, or in any position not suitable for further processing downstream. Such a skewed position of one or more parts comprises a part error. A plurality of parts piled up one atop another in a chaotic fashion is also a part error. A malformed part is sometimes introduced into the process. Such a part can, for example, have "flashing" or excess material around the mold parting line. Another example is a "short shot," wherein an insufficient volume of plastic resin was injected into the mold, and the part shows a missing portion. Such a malformed part also comprises a part error. The unjamming system disclosed herein will detect and remove any kind of part error and restore the normal process.

As used herein, the term "track" refers to any apparatus capable of conveying or moving or transferring parts along the process. This includes a track, a belt conveyor, a tube having a stream of air, or a pick and place robotic arm. The track includes one or more rails, or guide bars which convey the parts along the process path. It is to be understood that all conveying apparatus configurations described herein can be utilized for all embodiments of the unjamming system, within the spirit and scope of the claims.

FIGS. 1-3C depict a parts feeder, in this example a production rotating bowl feeder having an unjamming system 20. Parts are fed from a part source (not shown) into the bowl 22 which has an outer wall 24. The bowl 22 rotates on an axis of rotation in the direction of arrow 26 during normal operation. The parts 28 are thrown by centrifugal force outward to the perimeter of the bowl 22 and against the outer wall 24. The parts 28 then circulate with the bowl in the direction of arrow 26.

Figure 3A:
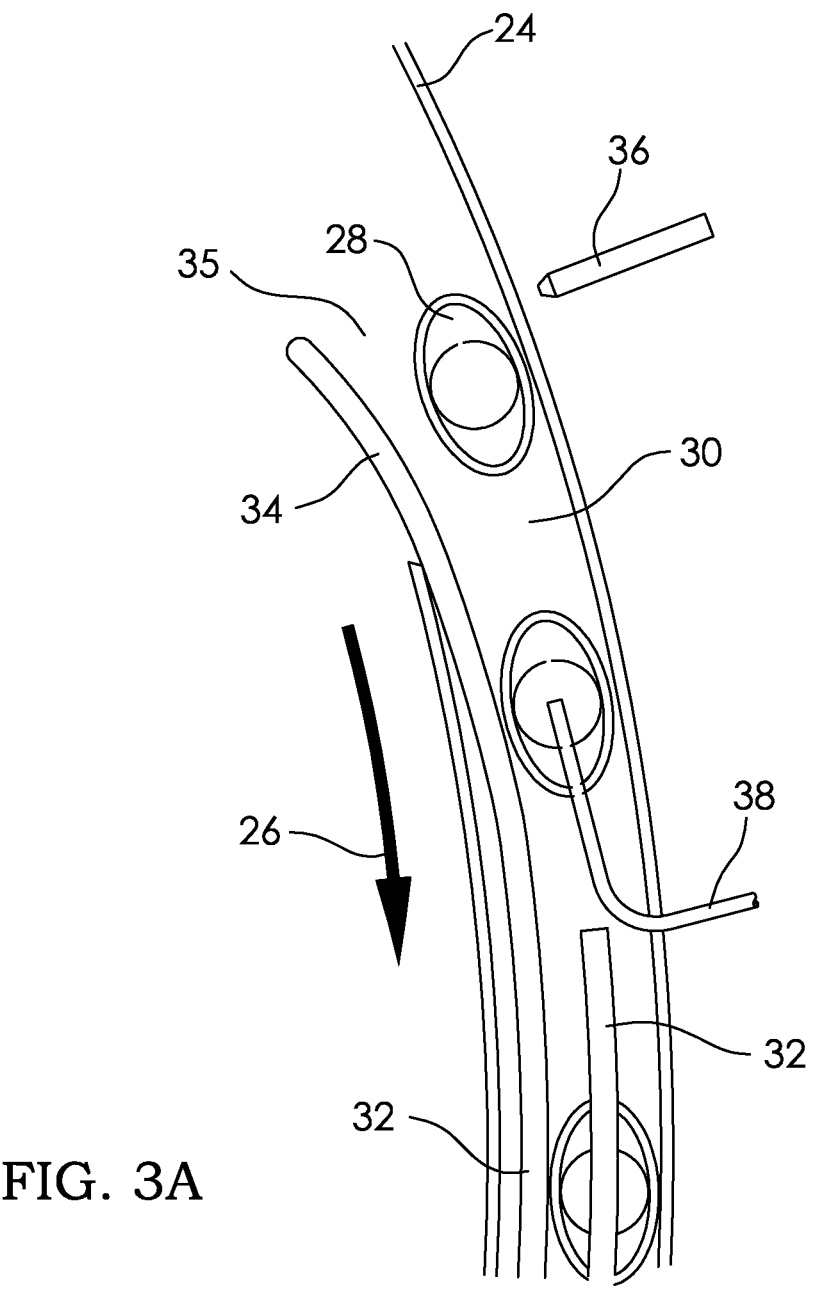
FIG. 3A is an enlarged detail view of the unjamming system of FIG. 1, taken at Detail 3 of FIG. 1, and showing the feeder in normal operation.
Figure 3B:
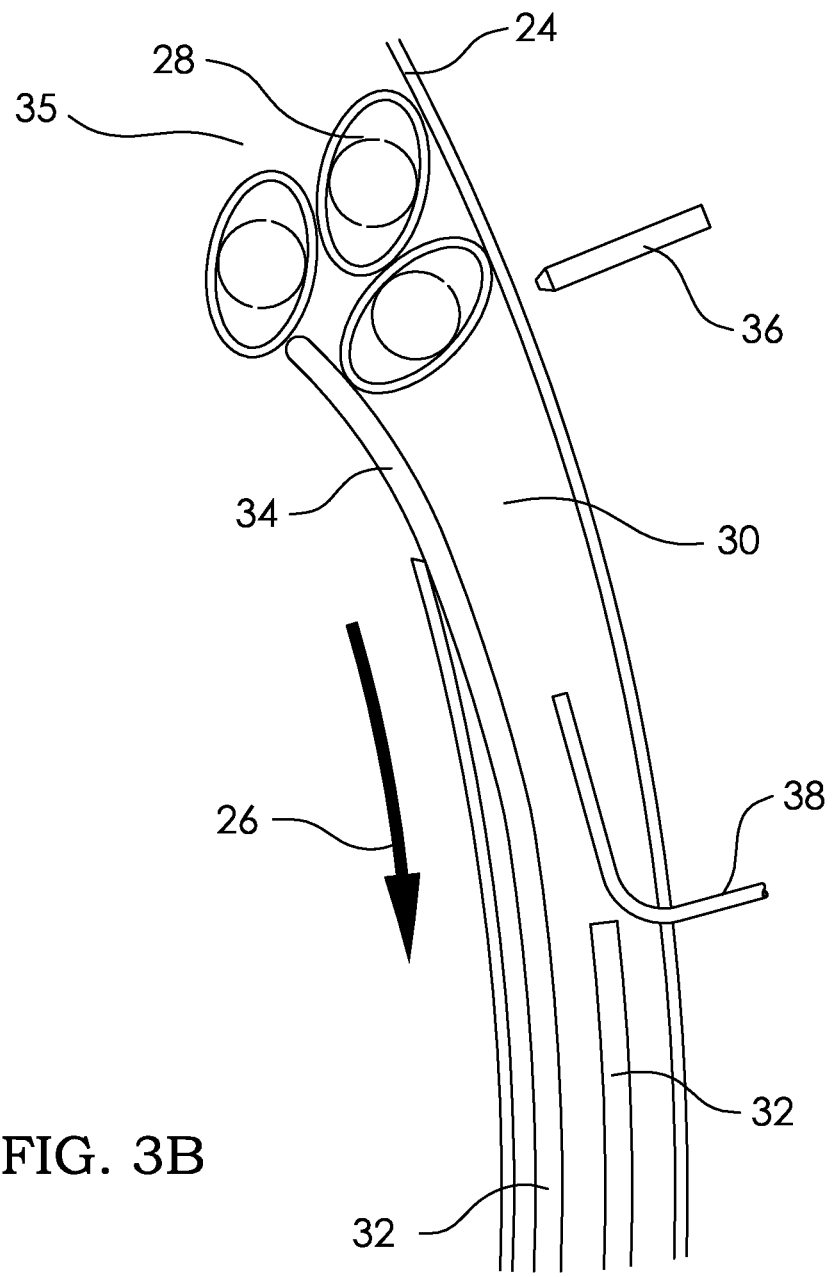
FIG. 3B is an enlarged detail view of the unjamming system of FIG. 1, taken at Detail 3 of FIG. 1, and showing the feeder during a jam.
Figure 3C:
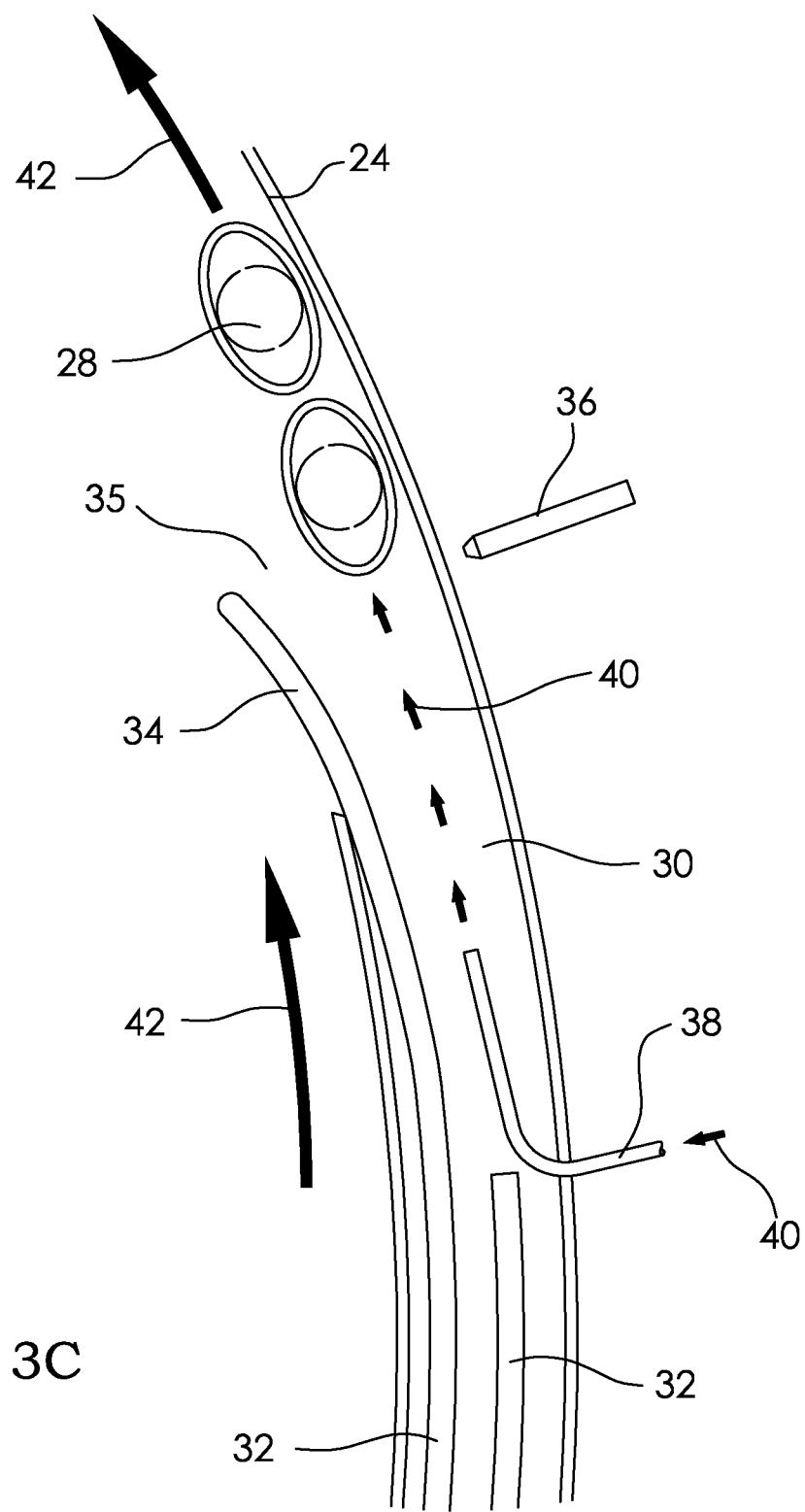
FIG. 3C is an enlarged detail view of the unjamming system of FIG. 1, taken at Detail 3 of FIG. 1, and showing the feeder during unjamming.
Figure 5:
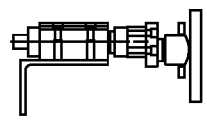
FIG. 5 is a partial, side elevational view of the unjamming system of FIG. 4.
Figure 4:
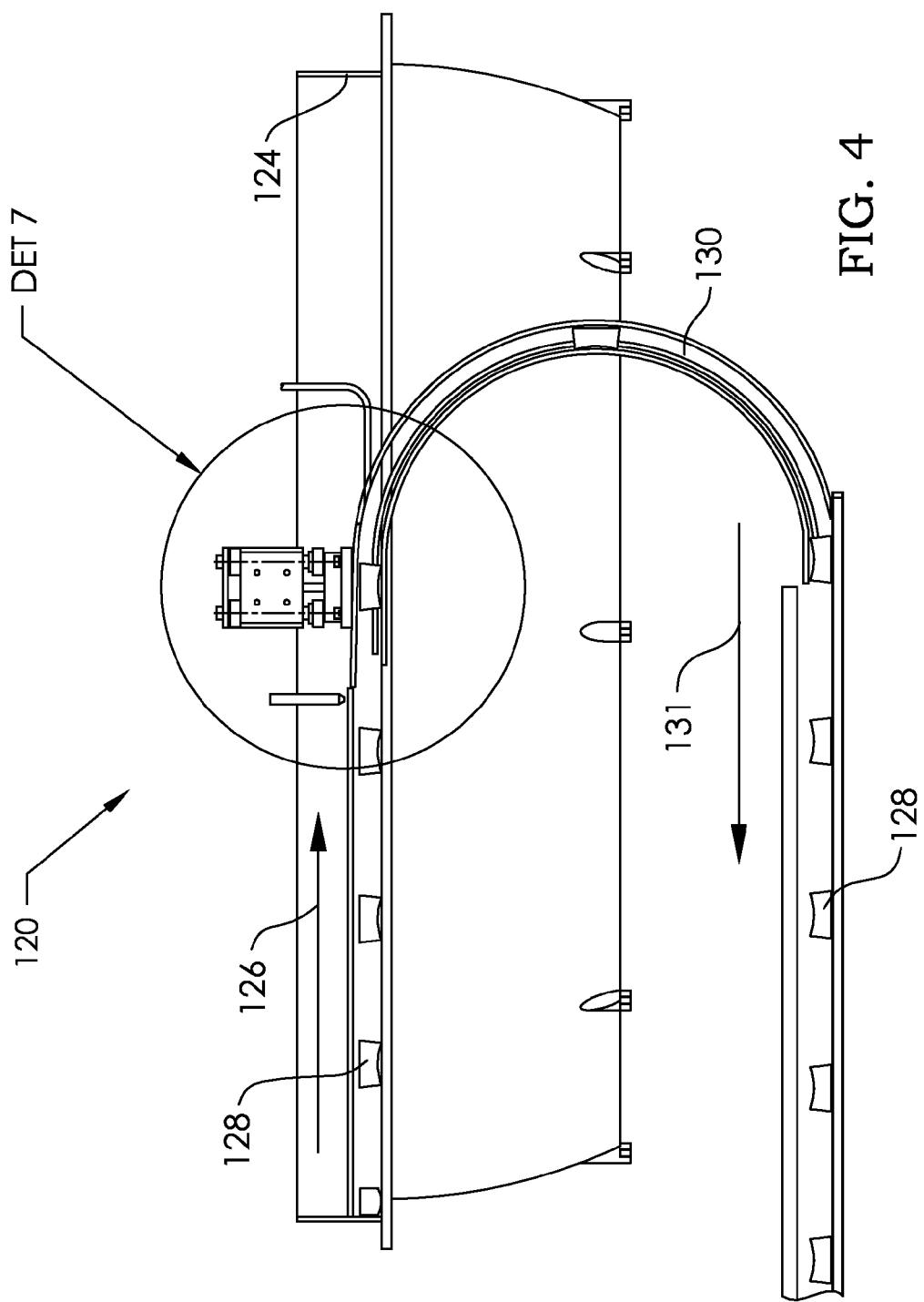
FIG. 4 is a side elevational view of another rotating bowl feeder utilizing another unjamming system constructed in accordance with the invention.
Figure 6:
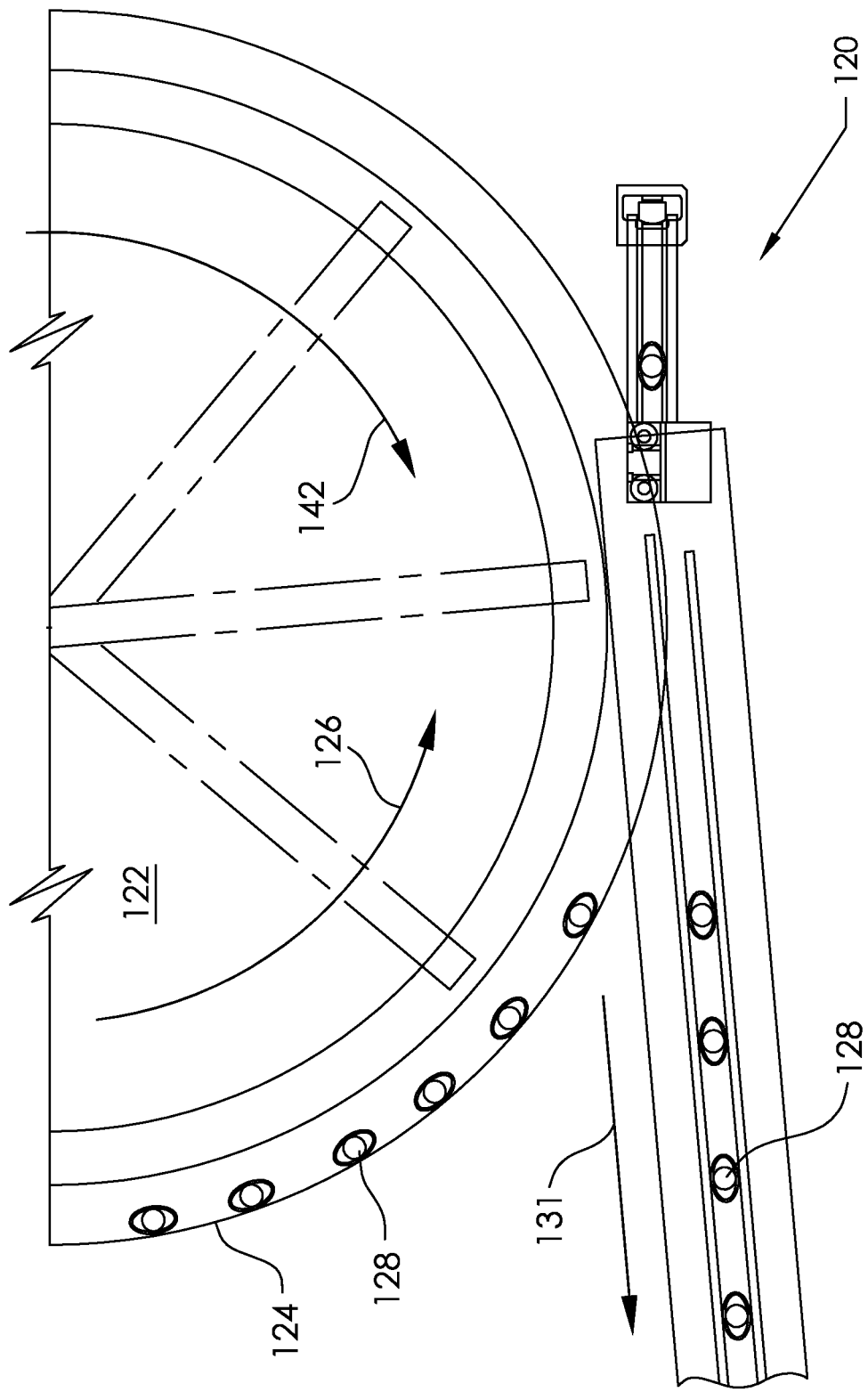
FIG. 6 is a top plan view of the rotating bowl feeder of FIG. 4.

The parts 28 enter a track 30 which is disposed generally tangential to the bowl perimeter. The parts 28 move in a process direction shown by arrow 31. The track 30 has four guide rails 32, one above the part, one below the part, and one on either side of the part 28. At least one of the guide rails 32 tapers away from the others to form a funnel-shaped portion, or track entry 34. The track entry 34 serves to guide the parts 28 onto the track 30, as shown in FIG. 3A in normal operation. The track entry 34 also serves to ensure that if a part error is to occur, it will happen at this jamming region, where it is detected and unjammed. A part 28 entering the track 30 turned sideways or upside-down will wedge as the guide rails 32 taper inward, causing a jam and part error, as shown in FIG. 3B.

The system is equipped with a sensor 36 to detect a part error. Sensor 36 is typically a laser directing light into a photocell, as is well known to those of ordinary skill in the art. It is to be understood that any sensor capable of detecting a part error can be utilized within the spirit and scope of the claims. The sensor 36 generates a sensor signal upon detecting a part error.

The system is equipped with an air nozzle 38 connected to a pressurized air supply delivering a jet of air shown by arrows 40. The nozzle is directed counter to the process direction.

In the event of a part error, the sensor 36 detects the part error. The bowl 22 reverses rotation direction, as shown by arrow 42, in response to the sensor signal. The air nozzle 38 directs the jet of air 40 against the part error, blowing the jammed parts backward into the bowl 22, in response to the sensor signal. Once the part error is cleared, the air nozzle 38 ceases blowing the jet of air 40, the bowl stops and then resumes normal rotation 26, and the parts 28 once again are fed into the track 30 in normal operation.

Referring now to FIGS. 4-7D, another parts feeder, in this example a rotating bowl feeder having an unjamming system is shown at 120. Unjamming system 120 is similar to unjamming system 20 described above, in that parts are fed from a part source (not shown) into the bowl 122 which has an outer wall 124. The bowl 122 rotates on an axis of rotation in the process rotary direction of arrow 126 during normal operation. The parts 128 are thrown by centrifugal force outward to the perimeter of the bowl 122 and against the outer wall 124. The parts 128 then circulate with the bowl in the direction of arrow 126.

The parts 128 enter a track 130 which is disposed generally tangential to the bowl perimeter. The parts 128 move in a process direction shown by arrow 131. The track 130 has four guide rails 132, one above the part, one below the part, and one on either side of the part 128. The track 130 shown curves 180° and directs the parts onto a straight track. It is to be understood that the track can be any configuration extending in any direction. All track configurations can be utilized for all embodiments of the unjamming system, within the spirit and scope of the claims.

The system is equipped with a sensor 136 to detect a part error. Sensor 136 is typically a laser directing light into a photocell, as is well known to those of ordinary skill in the art. The sensor 136 generates a sensor signal upon detecting a part error. It is to be understood that any sensor capable of detecting a part error can be utilized within the spirit and scope of the claims.

The system is equipped with an air nozzle 138 connected to a pressurized air supply delivering a jet of air shown by arrows 140. The nozzle 138 is directed in a direction opposite to the process direction 131.

Unjamming system 120 differs from unjamming system 20 described above, in that system 120 has first 133 and second 137 opposed elongated guide bars spaced apart a predetermined distance. The first 133 and second 137 guide bars receive and convey the parts 128 between the guide bars. The process path extends between the guide bars 133, 137. The first guide bar 133 has an opening 139 therethrough adjacent the jamming region 135. A guide bar segment 134 is disposed in the first guide bar opening 139. The guide bar segment 134 conveys the parts in concert with the first guide bar 133. The guide bar segment 134 is able to move transversely away from the process path in response to the sensor signal. This increases the distance between the guide bar segment 134 and the second guide bar 137. The result is to provide clearance for eliminating the part error. The guide bar segment 134 is adapted for movement between a first position inboard of the first guide bar 133 and a second position outboard of the first position. In the first position the distance between the guide bar segment 134 and the second guide bar 137 is less than the predetermined distance between the first 133 and second 137 guide bars. The parts 128 follow the process path allowing passage therethrough of parts in a process position, and denying passage therethrough of parts in a skewed position. The skewed parts will stop moving through the process path and will come to rest captured against the guide bar segment 134. This results in a parts error, which the sensor 136 will detect. The sensor 136 will then generate a signal which will cause the guide bar segment 134 to move away from the process path. In the second position the distance between the guide bar segment 134 and the second guide bar 137 is sufficient to release the skewed part, thereby providing clearance for eliminating the part error.

Figure 7A:
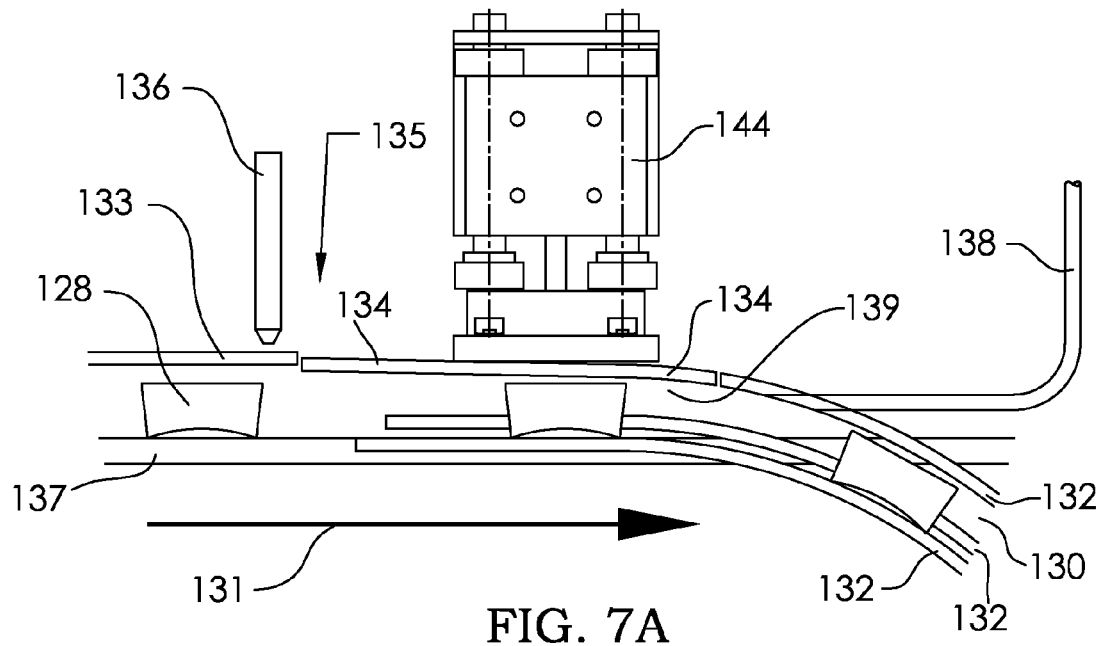
FIG. 7A is an enlarged, detail view of the unjamming system of FIG. 4, taken at Detail 7 of FIG. 4, and showing the feeder in normal operation.
Figure 7B:
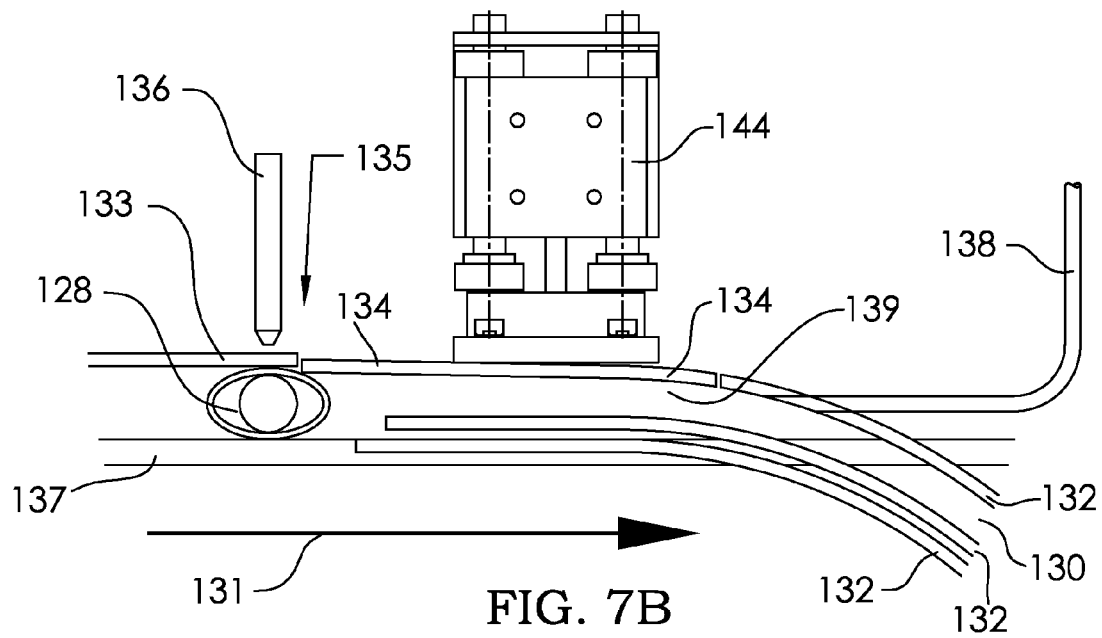
FIG. 7B is an enlarged, detail view of the unjamming system of FIG. 4, taken at Detail 7 of FIG. 4, and showing the feeder during a jam.
Figure 7C:
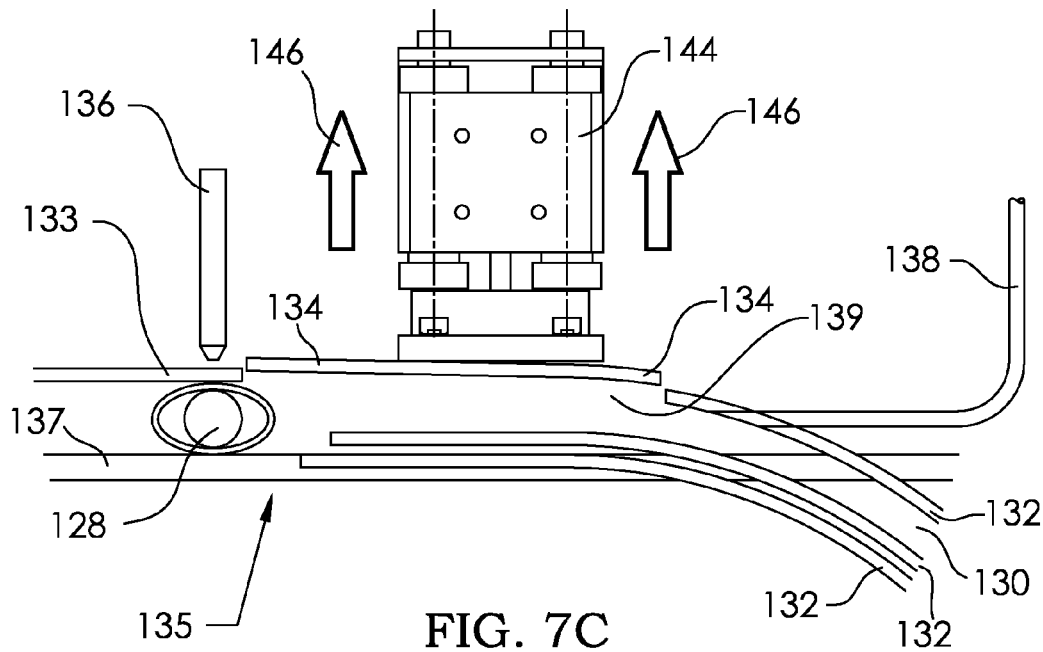
FIG. 7C is an enlarged, detail view of the unjamming system of FIG. 4, taken at Detail 7 of FIG. 4, and showing the feeder during unjamming.
Figure 7D:
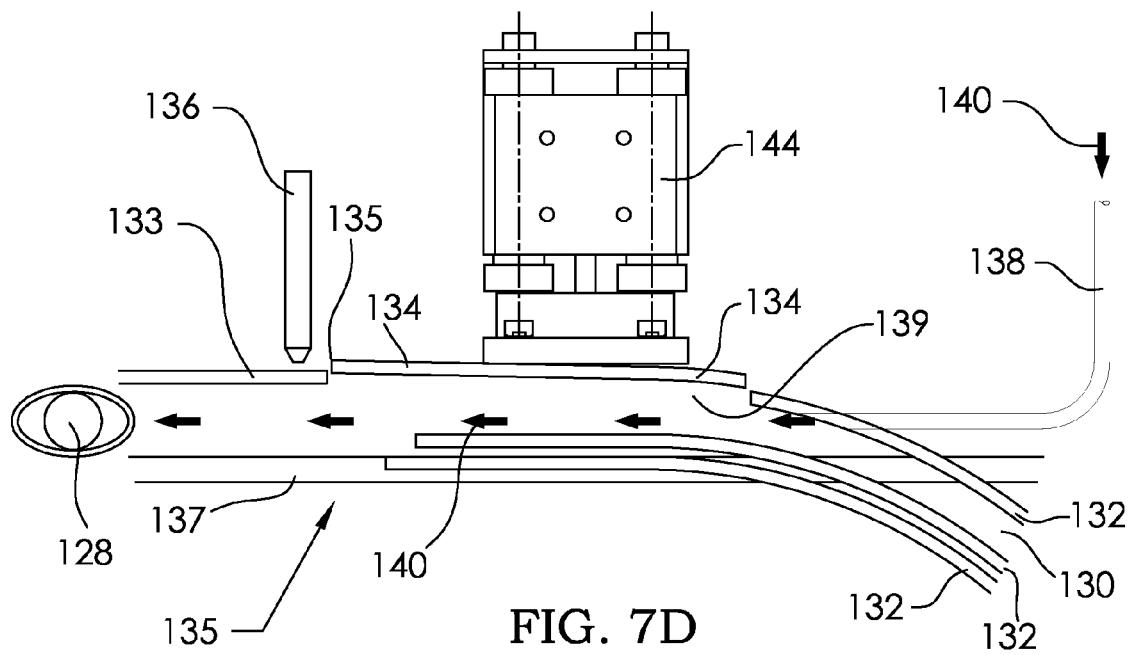
FIG. 7D is an enlarged, detail view of the unjamming system of FIG. 4, taken at Detail 7 of FIG. 4, and showing the feeder during unjamming.

In the embodiment shown, the first guide bar 133 is disposed above the second guide bar 137. The movable guide bar segment 134 is adapted to be raised upward away from the first guide bar 133. The guide bar segment 134 is disposed slightly lower than the first guide bar 133 by a predetermined offset to form a jamming region 135. The parts 128, when properly positioned upright and facing the process direction, will pass under guide bar segment 134, as shown in FIG. 7A. In the event of a part turning sideways, or skewed in some manner, the part 128 will jam underneath the guide bar segment 134, as shown in FIG. 7B. The predetermined offset is designed to ensure that if a jam or part error occurs, it happens at the guide bar segment 134, where it is detected and unjammed. An actuator 144 is adapted to raise the guide bar segment 134 until it is at or above the level of the first guide bar 133, as shown in FIG. 7C. However, the system will function if the guide bar segment 134 is raised to a trivial distance below the first guide bar 133. Arrows 146 show the raising upward of the guide bar segment 134. Actuator 144 is typically a pneumatic cylinder or double cylinder, as illustrated. It is to be understood that the actuator 144 can be a motor driven screw, a hydraulic cylinder, a solenoid, or any device capable of raising the guide bar segment 134. All actuator types can be utilized for all embodiments of the unjamming system, within the spirit and scope of the claims.

In the event of a part error, the sensor 136 detects the part error. The bowl 122 reverses for rotation in a direction opposite to the process rotary direction, as shown by arrow 142, in response to the sensor signal. At about this time, the actuator 144 raises the guide bar segment 134, in response to the sensor signal.

The air nozzle 138 directs the jet of air 140 against the part error, blowing the jammed parts backward into the bowl 122. Once the part error is cleared, the air nozzle 138 ceases blowing the jet of air 140, the bowl stops and then resumes normal rotation 126, the actuator 144 lowers the guide bar segment 134 back into normal position, and the parts 128 once again are fed into the track 130, resuming normal operation.

Turning now to FIGS. 8-11B, yet another parts feeder, specifically for example, a rotating bowl feeder 222 having yet another unjamming system is shown at 220. Unjamming system 220 is similar to unjamming system 20 described above, in that parts are fed from a part source (not shown) into the bowl 222 which has an outer wall 224. The bowl 222 rotates on an axis of rotation in the process rotary direction of arrow 226 during normal operation. The parts 228 are thrown by centrifugal force outward to the perimeter of the bowl 222 and against the outer wall 224. The parts 228 then circulate with the bowl in the direction of arrow 226.

The parts 228 enter a track 230 which is disposed generally tangential to the bowl perimeter. The parts 228 move in a process direction shown by arrow 231. The track 230 has four guide rails 232, one above the part, one below the part, and one on either side of the part 228. The track 230 shown curves 180° and directs the parts onto a straight track. It is to be understood that the track can be any configuration extending in any direction. All track configurations can be utilized for all embodiments of the unjamming system, within the spirit and scope of the claims.

The system is equipped with a sensor 236 to detect a part error. Sensor 236 is typically a laser directing light into a photocell, as is well known to those of ordinary skill in the art. The sensor 236 generates a sensor signal upon detecting a part error. It is to be understood that any sensor capable of detecting a part error can be utilized within the spirit and scope of the claims.

The system is equipped with an air nozzle 238 connected to a pressurized air supply delivering a jet of air shown by arrows 240. The nozzle 238 is directed opposite to the process direction.

Unjamming system 220 differs from unjamming system 20 described above, in that system 220 has first 233 and second 237 opposed elongated guide bars spaced apart a predetermined distance. The first 233 and second 237 guide bars receive and convey the parts 228 between the guide bars. The process path extends between the guide bars 233, 237. The first guide bar 233 has an opening 239 therethrough adjacent the jamming region 235. A guide bar segment 234 is disposed in the first guide bar opening 239. The guide bar segment 234 conveys the parts in concert with the first guide bar 233. The guide bar segment 234 is able to move transversely away from the process path in response to the sensor signal. This increases the distance between the guide bar segment and the second guide bar. The result is to provide clearance for eliminating the part error.

The first 233 and second 237 guide bars are spaced apart generally horizontally. The parts 228 are supported against gravity, in this case by second guide bar 237. The guide bar segment 234 is adapted for movement between a first position generally aligned with the first guide bar 233 and a second position outboard of the first position. In the first position the distance between the guide bar segment 234 and the second guide bar 237 is generally equal to the predetermined distance between the first 233 and second 237 guide bars. The parts follow the process path allowing passage therethrough of parts in a process position. In the second position the distance between the guide bar segment 234 and the second guide bar 237 is greater than the predetermined distance between the first 233 and second 237 guide bars. This opens up a space in the event of a part error, so that the parts are no longer supported and will fall by gravity.

Figure 8:
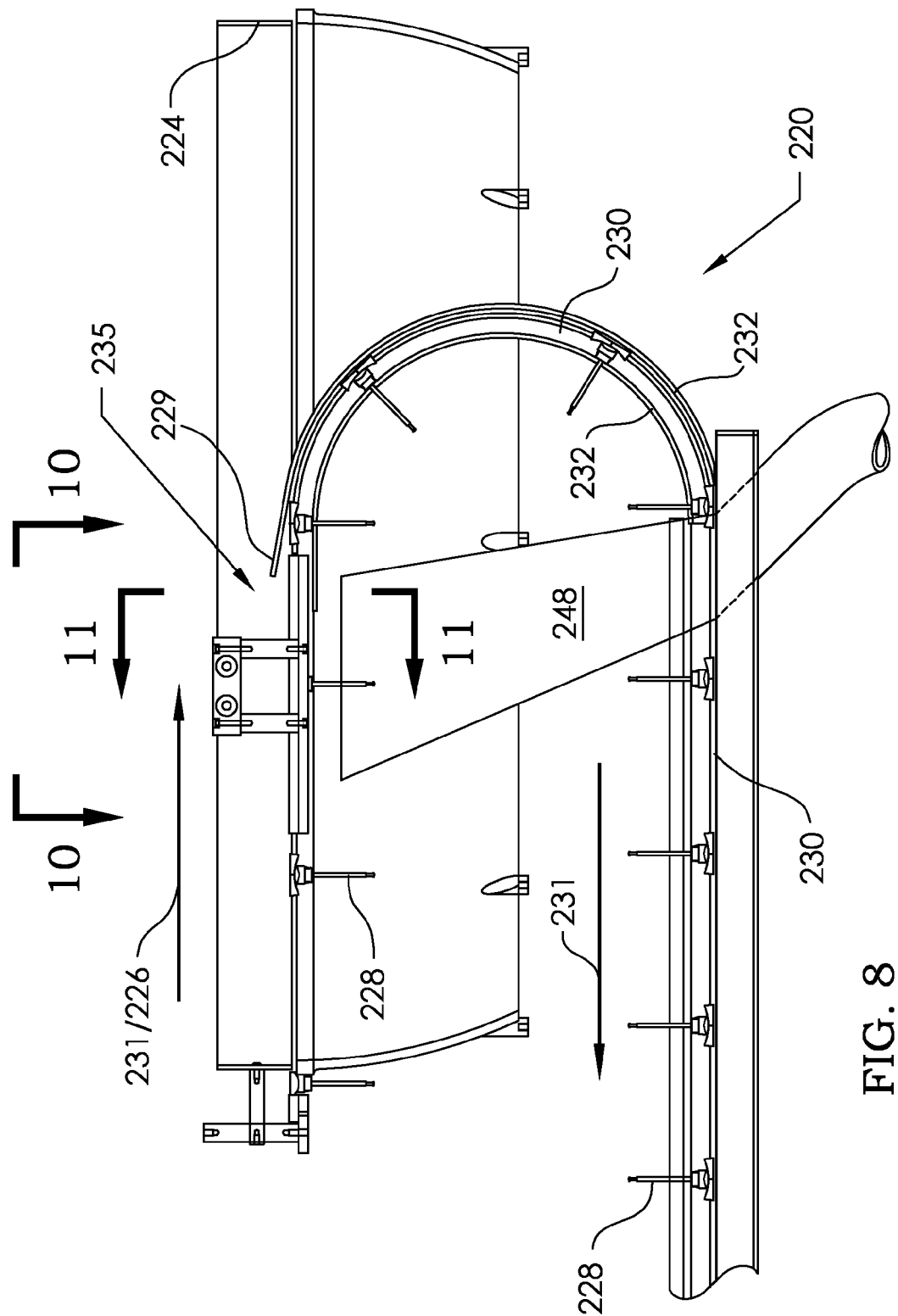
FIG. 8 is a side elevational view of yet another rotating bowl feeder utilizing yet another unjamming system constructed in accordance with the invention.
Figure 9:
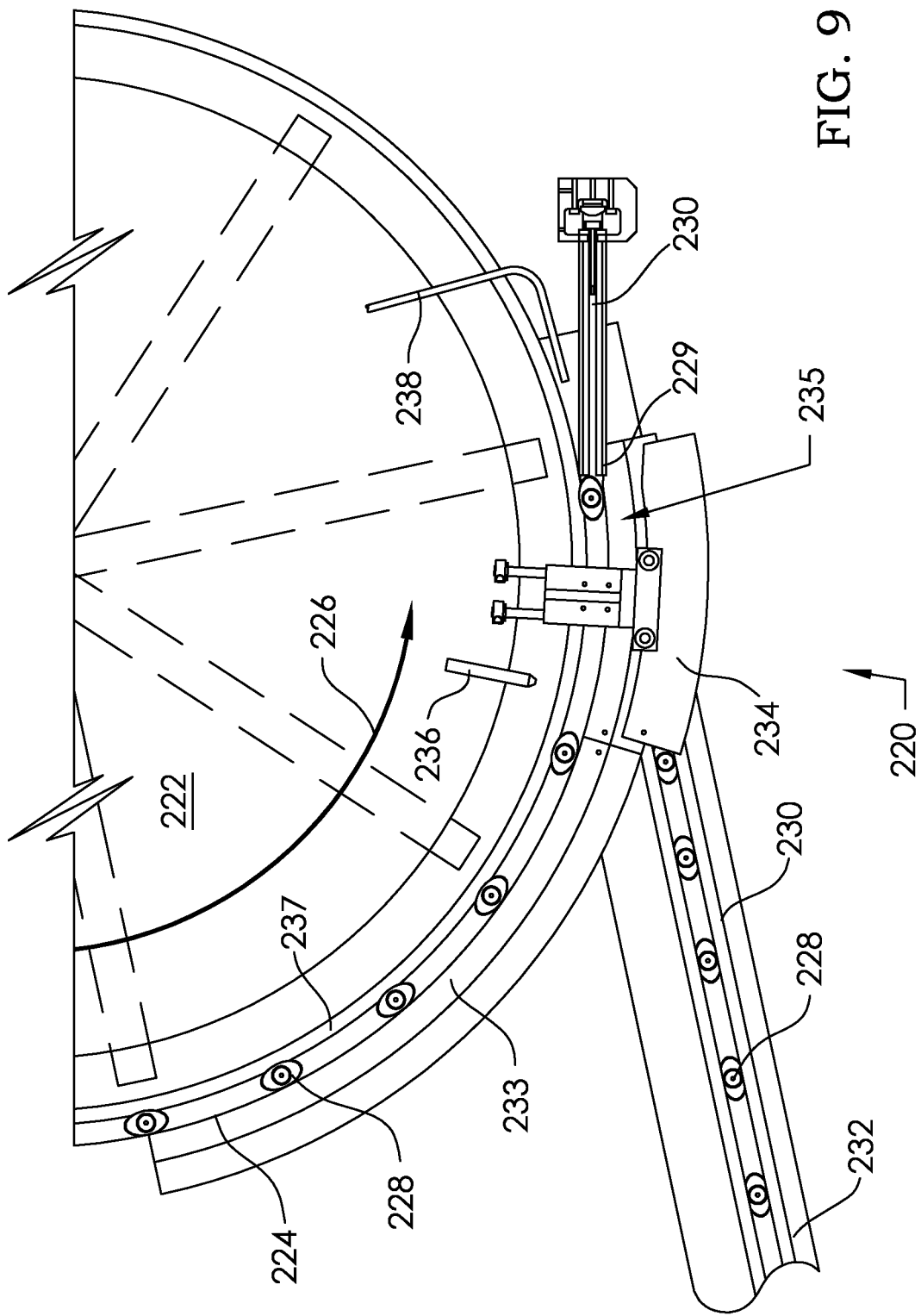
FIG. 9 is a top plan view of the rotating bowl feeder of FIG. 8.
Figure 10A:
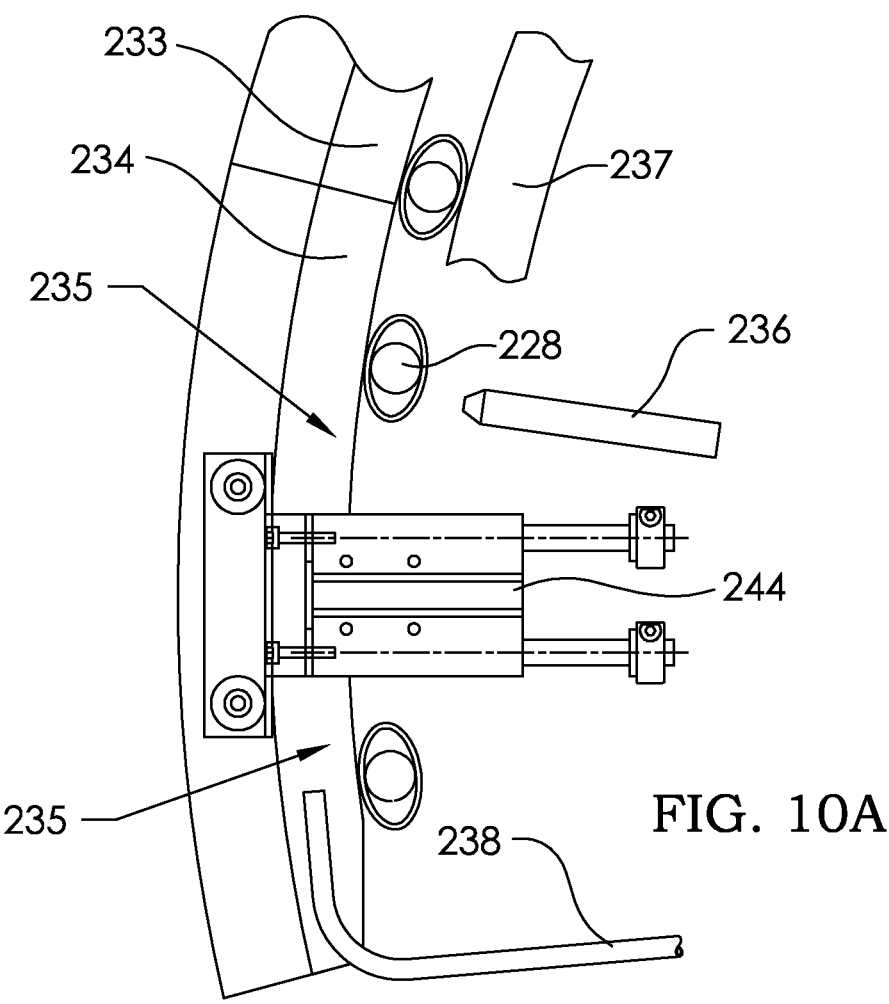
FIG. 10A is an enlarged, detail top plan view of the unjamming system of FIG. 8, taken at 10-10 of FIG. 8, and showing the feeder in normal operation. The view is rotated 90° cw.
Figure 11A:
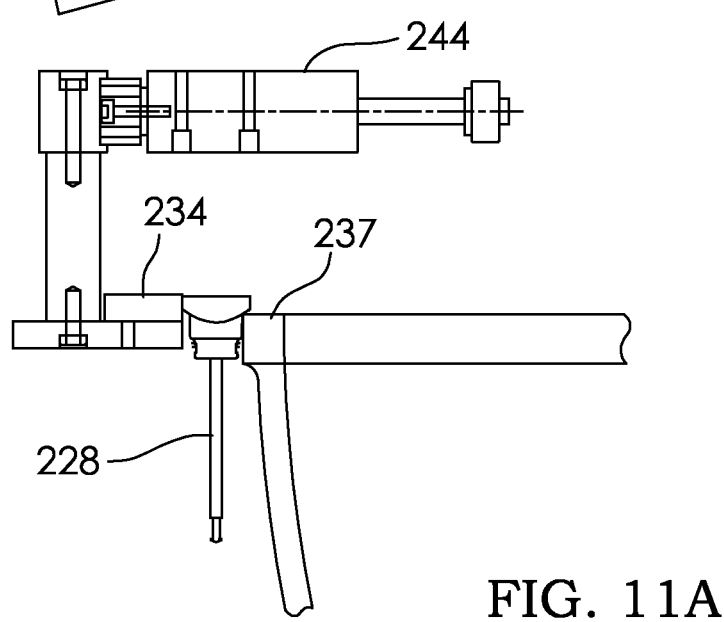
FIG. 11A is an enlarged, detail side elevational view of the unjamming system of FIG. 8, taken at 11-11 of FIG. 8, and showing the feeder in normal operation.

In the embodiment shown, the first guide bar 233 is arcuate. The movable guide bar segment 234 is also arcuate, and is able to move sideways away from the first guide bar 233 and away from the guide rails 232. Guide bar segment 234 is aligned with first guide bar 233 under normal operating conditions, as shown in FIGS. 10A and 11A. At least one of the guide rails 232, in this case the upper guide rail tapers to form a funnel-shaped portion, or track entry 229. The track entry 229 serves to guide the parts 228 onto the track 230, as shown in FIG. 8 in normal operation. The track entry 229 also serves to ensure that if a jam-up or part error is to occur, it will happen at this jamming region 235, where it is detected and unjammed. The track entry 229 can be formed by any of the guide rails 232, even those not shown tapered. Any guide rail that is tapered can be utilized as track entry 229 for all embodiments of the unjamming system, within the spirit and scope of the claims. A part 228 entering the track 230 turned sideways or upside-down will wedge as the track entry 229 tapers toward the track 230 in the process direction, causing a jam and pile-up, which is a part error, in the jamming region 235. The parts 228, when properly positioned upright and facing the process direction, will pass through guide bar segment 234 and onto the track 230. In the event of a part turning sideways, or skewed in some manner, the part 228 will jam adjacent the jamming region 235.

Figure 10B:
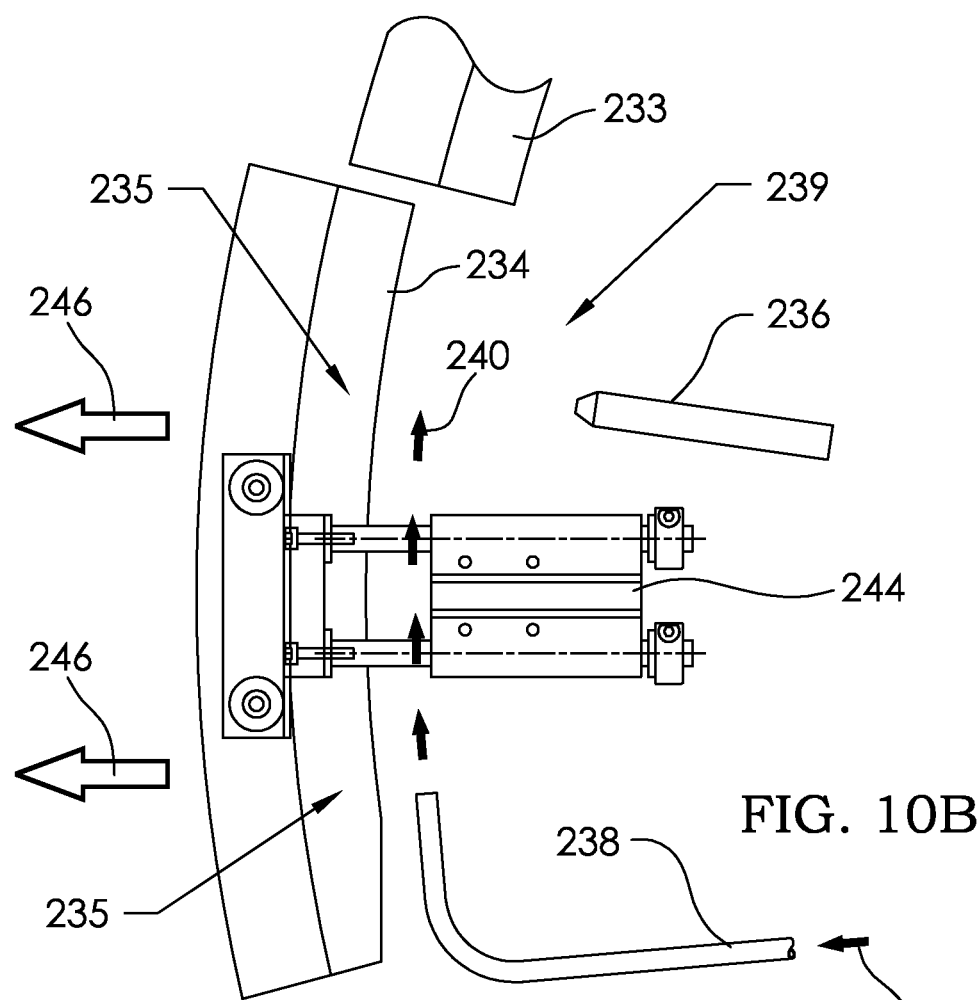
FIG. 10B is an enlarged, detail top plan view of the unjamming system of FIG. 8, taken at 10-10 of FIG. 8, and showing the feeder during unjamming. The view is rotated 90° cw.
Figure 11B:
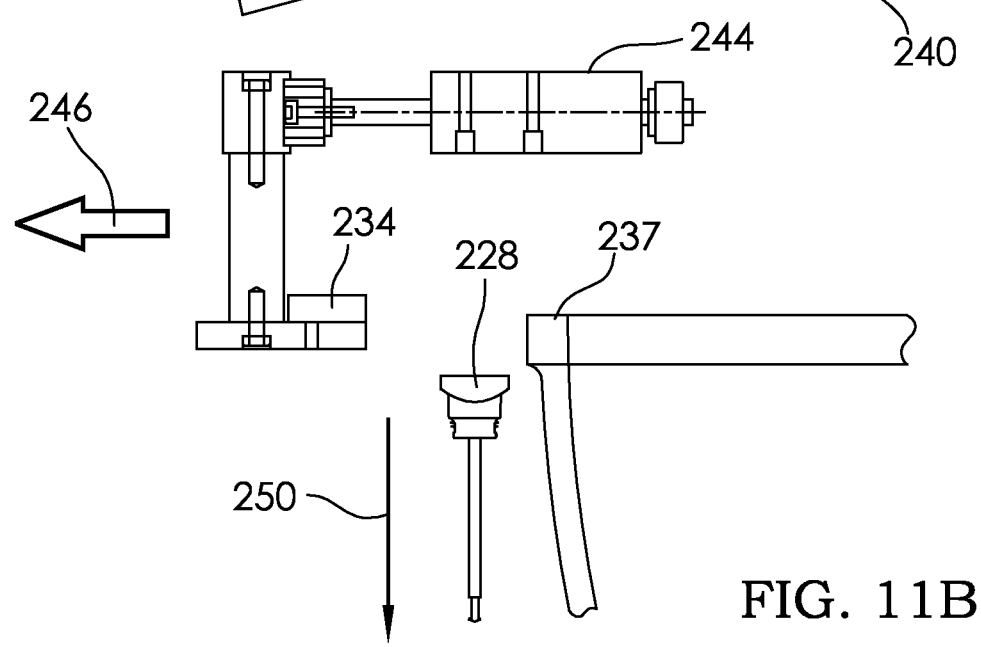
FIG. 11B is an enlarged, detail side elevational view of the unjamming system of FIG. 8, taken at 11-11 of FIG. 8, and showing the feeder during unjamming.

An actuator 244 is adapted to move the guide bar segment 234 sideways as shown in FIGS. 10B and 11B, until a gap opens between the guide bar segment 234 and the first guide bar 233 as shown in FIG. 11B. Arrows 246 show the outward movement of the guide bar segment 234. Actuator 244 is typically a pneumatic cylinder or double cylinder, as illustrated. It is to be understood that the actuator 244 can be a motor driven screw, a hydraulic cylinder, a solenoid, or any device capable of translating the guide bar segment 234. All actuator types can be utilized for all embodiments of the unjamming system, within the spirit and scope of the claims.

In the event of a part error, the sensor 236 detects the part error. At about this time, the actuator 244 translates the guide bar segment 234 outward, in response to the sensor signal. The air nozzle 238 directs the jet of air 240 against the part error, in response to the sensor signal, blowing the jammed or skewed parts off the guide bars 234, 237 as shown in FIG. 11B. The freed parts 228 fall by gravity, shown by arrow 250, down into a parts receiver (hopper) 248 from which they are discarded or conveyed back into the bowl 222 (conveyor not shown). Once the part error is cleared, the air nozzle 238 ceases blowing the jet of air 240, the actuator 244 translates the guide bar segment 234 back into normal position, and the parts 228 once again are fed into the track 230, resuming normal operation.

Referring now to FIGS. 12-16, still another parts feeder, in this example rotating bowl feeder having still another unjamming system is shown at 320. Unjamming system 320 is similar to unjamming system 20 described above, in that parts are fed from a part source (not shown) into the bowl 322 which has an outer wall 324. The bowl 322 rotates on an axis of rotation in the direction of arrow 326 during normal operation. The parts 328 are thrown by centrifugal force outward to the perimeter of the bowl 322 and against the outer wall 324.

Unjamming system 320 differs from unjamming system 20 described above, in that the parts 328 drop into pockets 327, one part per pocket 327. The pockets 327 are closed on three sides and open along the outer side 338, where the outer wall 324 retains the part 328 in the pocket 327. The parts 328 then circulate with the bowl in the direction of arrow 326. The parts 328 are pulled individually out of each pocket by a part discharger mounted on a bracket 350. The part discharger 329 has an articulated finger which is inserted into the part and pulls the part outward. The parts 328 enter a track 330 which is disposed adjacent the bowl. The parts 328 then move off in a process direction shown by arrow 331. The track 330 has four guide rails 332, one above the part, one below the part, and one on either side of the part 328. Unjamming system 320 has first 333 and second 337 opposed elongated guide bars spaced apart a predetermined distance. The first 333 and second 337 guide bars receive and convey the parts 328 between the guide bars. The process path extends between the guide bars 333, 337. The first guide bar 333 has an opening 339 therethrough adjacent the jamming region 335. A guide bar segment 334 is disposed in the first guide bar opening 339. The guide bar segment 334 conveys the parts in concert with the first guide bar 333. The guide bar segment 334 is able to move transversely away from the process path in response to the sensor signal. This increases the distance between the guide bar segment 334 and the second guide bar 337. The result is to provide clearance for eliminating the part error.

The first 333 and second 337 guide bars are spaced apart generally horizontally. The parts 328 are supported against gravity, in this case by third guide bar 342. The guide bar segment 334 is adapted for movement between a first position generally aligned with the first guide bar 333 and a second position outboard of the first position. In the first position the distance between the guide bar segment 334 and the second guide bar 337 is generally equal to the predetermined distance between the first 333 and second 337 guide bars. The parts follow the process path allowing passage therethrough of parts in a process position. In the second position the distance between the guide bar segment 334 and the second guide bar 337 is greater than the predetermined distance between the first 333 and second 337 guide bars. This opens up a space in the event of a part error, allowing the parts to be removed, as explained hereinbelow.

The system is equipped with a sensor 336 to detect a part error. Sensor 336 is typically a laser directing light into a photocell, as is well known to those of ordinary skill in the art. The sensor 336 generates a sensor signal upon detecting a part error. It is to be understood that any sensor capable of detecting a part error can be utilized within the spirit and scope of the claims.

Figure 13:
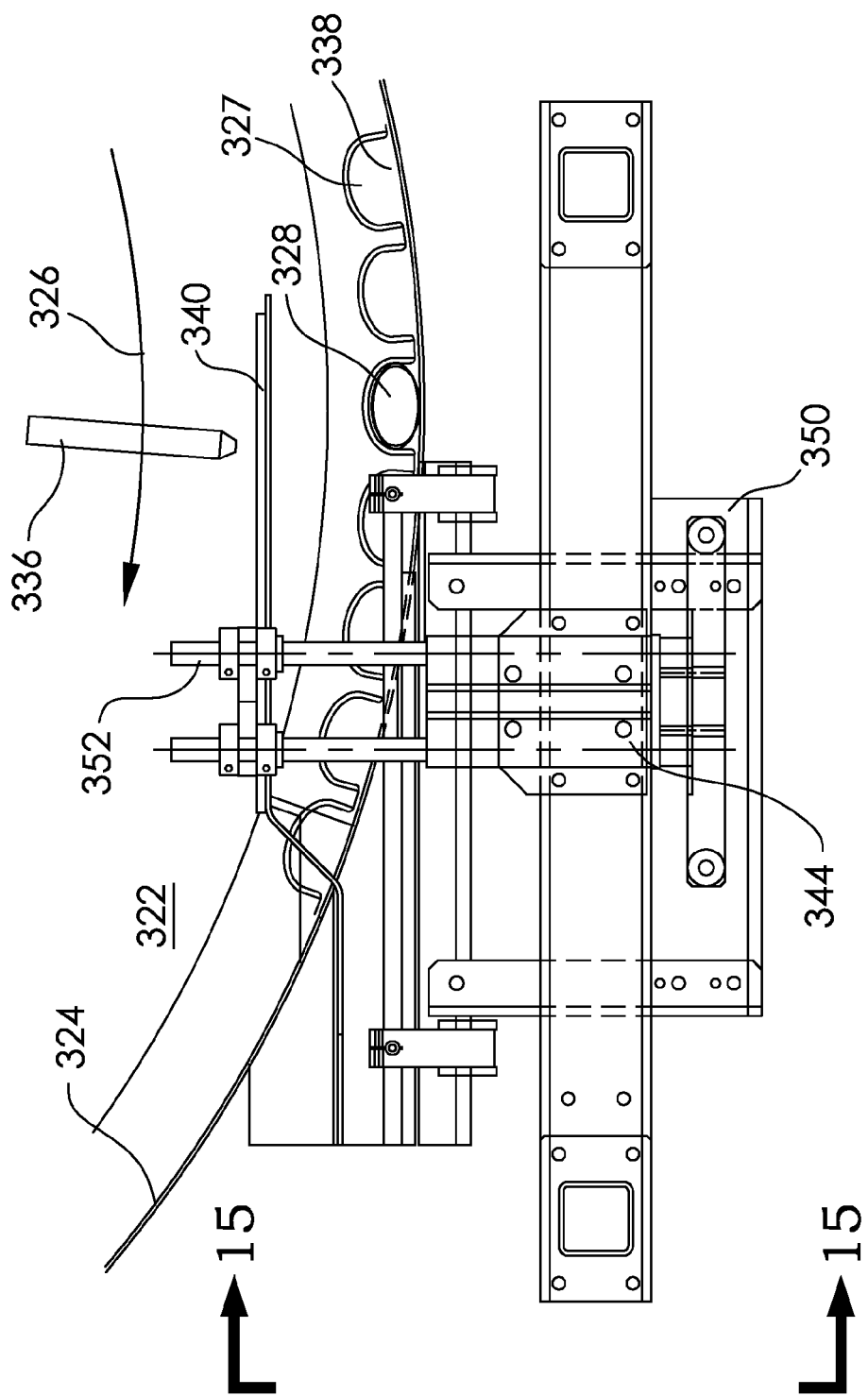
FIG. 13 is a top plan view of the rotating bowl feeder of FIG. 12, and showing the feeder in normal operation.
Figure 14:
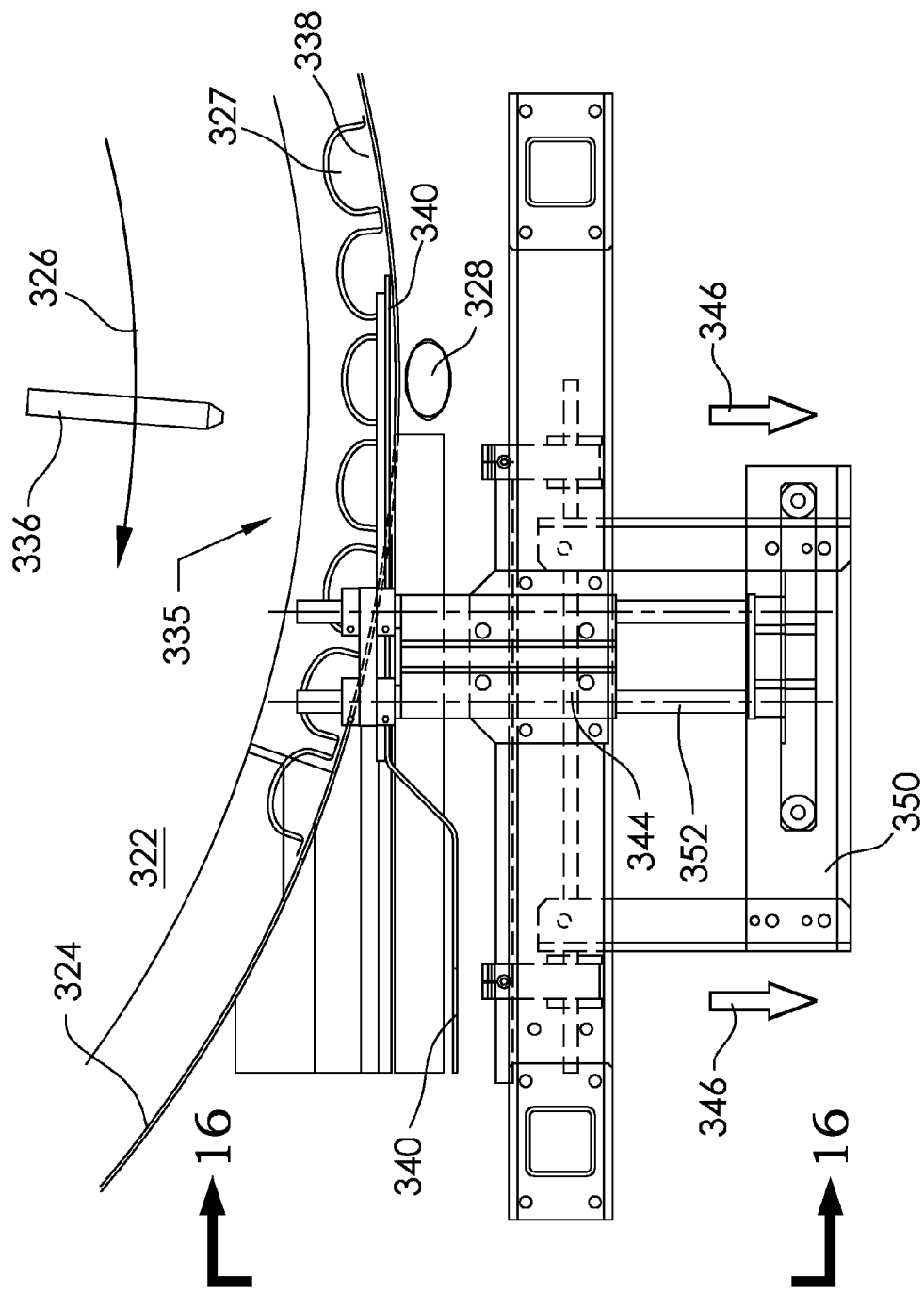
FIG. 14 is a top plan view of the rotating bowl feeder of FIG. 12, and showing the feeder during unjamming.
Figure 15:
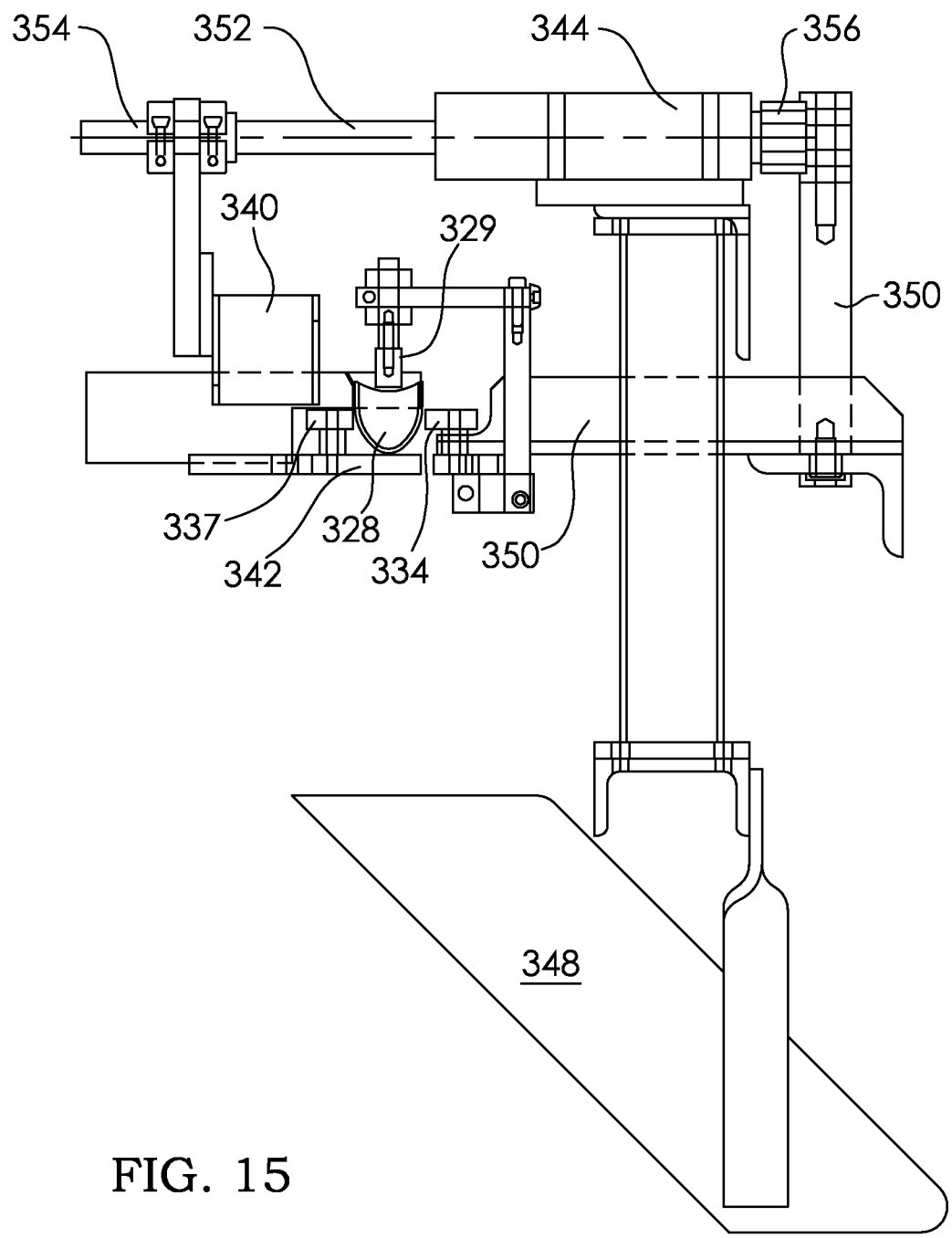
FIG. 15 is a side elevational view of the rotating bowl feeder of FIG. 12, taken at 15-15 of FIG. 13, and showing the feeder in normal operation. The view is rotated 90° ccw.
Figure 16:
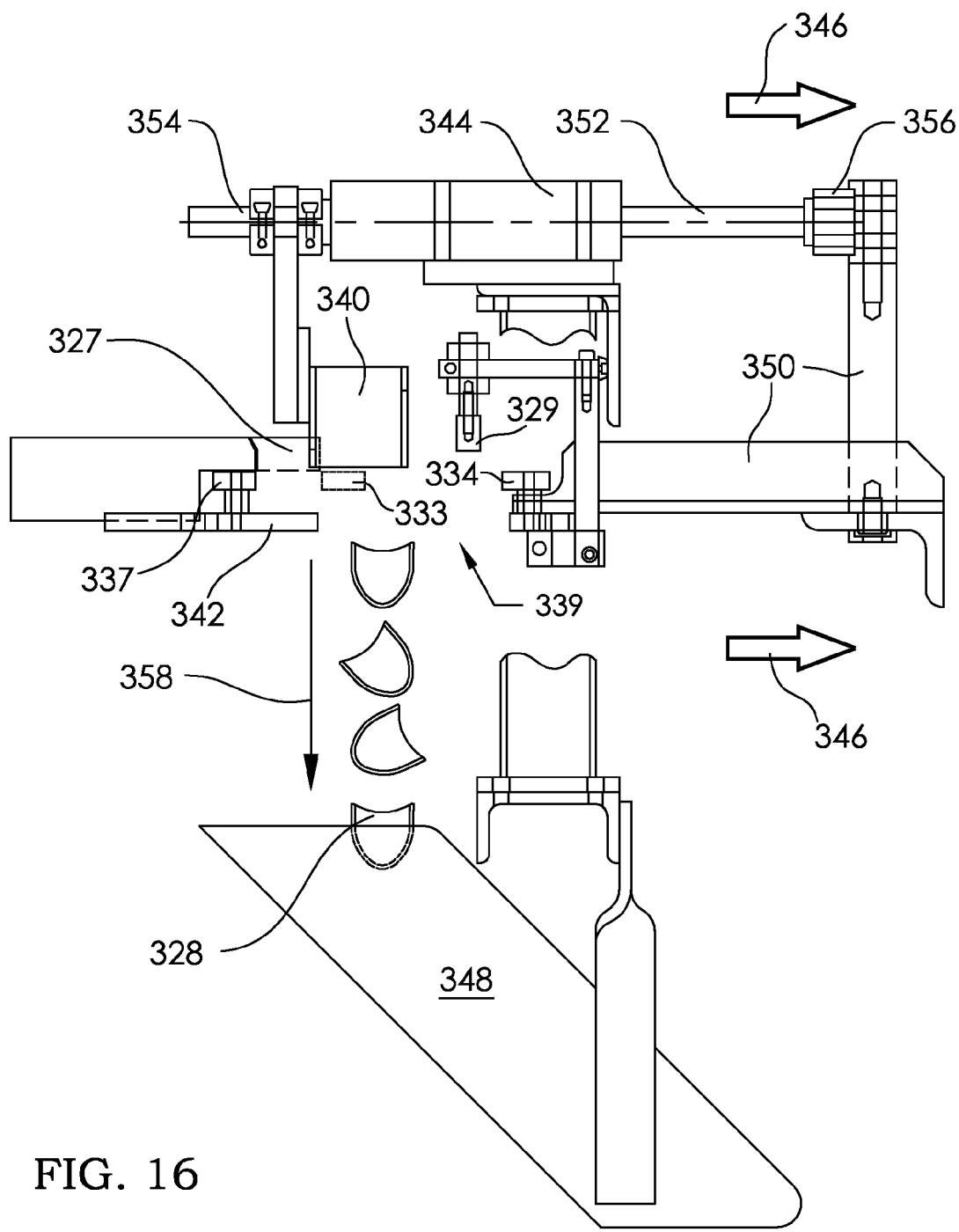
FIG. 16 is a side elevational view of the rotating bowl feeder of FIG. 12, taken at 16-16 of FIG. 14, and showing the feeder during unjamming. The view is rotated 90° ccw.

Since each pocket 327 holds only one part 328, a part error does not result in a pile-up. A part error comprises a part received in a pocket inverted or sideways or in some skewed position. The bowl 322 is rotary indexed until the pocket having the part error is angularly aligned with a jamming region 335, where the bowl rotation is stopped. The outer wall 324 is discontinuous in the jamming region 335, leaving the pocket 327 open on the outer side 338. A sweep bar 340 is disposed adjacent the jamming region 335. The sweep bar 340 is adapted to be moved transversely across the pockets 327, sweeping the parts 328 out of the pockets 327. The sweep bar 340 is parked out of the way of the pockets 327 under normal operating conditions, as shown in FIG. 13.

An actuator 344 has cylinder rods 352 adapted to translate inward and outward with respect to the bowl axis of rotation. The sweep bar 340 is attached to an inboard end 354 of the cylinder rods 352. The bracket 350 is attached to an outboard end 356 of the cylinder rods 352. The guide bar segment 334 is also attached to the cylinder rods' outboard end 356. As the cylinder rods 352 translate outward in response to the sensor signal, the bracket 350, the guide bar segment 334, and the part discharger 329 all move outward, opening a space outboard of the pockets 327. The sweep bar 340 moves outward simultaneously pushing the parts 328 out of the pockets 327. The sweep bar is adapted for movement between a first position inboard of the outer wall to a second position outboard of the outer wall. The sweep bar 340 is vertically juxtaposed with the parts 328. Upon movement from the first position to the second position the sweep bar 340 will sweep the parts out of the bowl 322, and the part discharger 329 will move outward, out of the way of the sweep bar 340, allowing the parts 328 to be swept outward. The parts 328 will then fall by gravity, as shown by arrow 358, to be discarded or collected into a hopper 348. Arrows 346 show the outward movement of the cylinder rods 352 and the bracket 350. Actuator 344 is typically a pneumatic cylinder or double cylinder, as illustrated. It is to be understood that the actuator 344 can be a motor driven screw, a hydraulic cylinder, a solenoid, or any device capable of translating the bracket 350, the guide bar segment 334, and the discharger 329, and any associated parts. All actuator types described can be utilized for all embodiments of the unjamming system, within the spirit and scope of the claims.

In the event of a part error, the sensor 336 detects the part error. The bowl 322 is rotary indexed into juxtaposition with the jamming region 335, where the bowl rotation is stopped. The actuator 344 translates the bracket 350, the guide bar segment 334, and the discharger 329 outward. The sweep bar 340 translates across the pockets 327, sweeping the parts 328 out of the pockets 327 and into the hopper 348. The freed parts 328 are either discarded or conveyed back into the bowl 322 (conveying means not shown). Once the part error is cleared, the actuator 344 translates the bracket 350, the guide bar segment 334, the discharger 329, and the sweep bar 334 back into normal position. The bowl rotation resumes, and the parts 328 once again are fed into the track 330, resuming normal operation.

It will be appreciated that variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

PARTS LIST

Unjamming System for Molded Product Feeders

Part
No. Description
20 unjamming system
22 bowl
24 outer wall
26 normal rotation
28 parts
30 track
31 process direction
32 guide rails
34 track entry
35 jamming region
36 sensor
38 air nozzle
40 jet of air
42 reverse rotation
120 unjamming system
122 bowl
124 outer wall
126 normal rotation
128 parts
130 track
131 process direction
132 guide rails
133 first guide bar
134 guide bar segment
135 jamming region
136 sensor
137 second guide bar
138 air nozzle
139 guide bar opening
140 jet of air
142 reverse rotation
144 actuator
146 raising upward
220 unjamming system 222 bowl
224 outer wall
226 normal rotation
228 parts
229 track entry
230 track
231 process direction
232 guide rails
233 first guide bar
234 guide bar segment
235 jamming region
236 sensor
237 second guide bar
238 air nozzle
239 guide bar opening
240 jet of air
244 actuator
246 outward movement
248 hopper
250 arrow falling parts
320 unjamming system
322 bowl
324 outer wall
326 normal rotation
327 pockets
328 parts
329 part discharger
330 track
331 process direction
332 guide rails
333 first guide bar
334 guide bar segment
335 jamming region
336 sensor
337 second guide bar
338 pocket outer side
339 guide bar opening
340 sweep bar
342 third guide bar
344 actuator
346 outward movement
348 hopper
350 bracket
352 cylinder rods
354 rods inboard end
356 rods outboard end
358 arrow falling parts

What is claimed is:

1. An unjamming system for use in connection with mass-produced parts fed through a process path in a process direction, the parts being fed by a parts feeder, the unjamming system comprising:
a jamming region wherein unjamming is carried out;
a sensor adjacent the process path for detecting a part error, the sensor being adapted for generating a sensor signal;
removing means adjacent the jamming region, the removing means being responsive to the sensor signal, for removing the parts from the jamming region; and
returning means for returning the parts to the parts feeder, the returning means moving the parts in a direction opposite to the process direction; wherein
the parts feeder further comprises a generally circular bowl feeder adapted for rotation in a process rotary direction, the bowl feeder being adapted for reversing for rotation in a direction opposite to the process rotary direction, so as to receive the parts moving in the direction opposite to the process direction.

2. The unjamming system of claim 1, wherein the removing means further comprises an air nozzle adjacent the jamming region and directed in a direction opposite to the process direction, the air nozzle being connected to a pressurized air supply, the air nozzle being adapted for delivering a jet of air to the part error in response to the sensor signal, so as to blow the parts in a direction opposite to the process direction, thereby eliminating the part error.

3. The unjamming system of claim 1, wherein the returning means further comprises an air nozzle adjacent the jamming region and directed in a direction opposite to the process direction, the air nozzle being connected to a pressurized air supply, the air nozzle being adapted for delivering a jet of air to the part error in response to the sensor signal, so as to blow the parts in a direction opposite to the process direction, thereby returning the parts to the parts feeder.

4. An unjamming system for use in connection with mass-produced parts fed through a process path in a process direction, the parts being fed by a parts feeder, the unjamming system comprising:
the parts feeder includes a rotary bowl with a bowl perimeter;
a track disposed adjacent to the bowl perimeter, the track having at least two guide rails, one guide rail on either side of the process path for directing parts to enter the track along the process path, the two guide rails being spaced apart a predetermined distance and adapted for receiving and conveying the parts between the guide rails;
a jamming region wherein unjamming is carried out;
a sensor adjacent the process path for detecting a part error, the sensor being adapted for generating a sensor signal;
removing means adjacent the jamming region, the removing means being responsive to the sensor signal, for removing the parts from the jamming region; and
returning means for returning the parts to the parts feeder, the returning means moving the parts in a direction opposite to the process direction; wherein
one of the guide rails tapers away from the other guide rail to form a funnel-shaped track entry;
the predetermined distance is sufficient to allow parts that are in a process position to enter the track, and the funnel-shaped track entry is adapted to guide the parts that are in a process position onto the track;
the predetermined distance is insufficient to allow parts that are in a skewed position to enter the track, and the funnel-shaped track entry is adapted to cause parts that are in a skewed position to wedge and jam as the guide rails taper inward; and
the jam will be detected and unjammed.

* * * * *